United States Patent
Mizuno et al.

(10) Patent No.: US 9,549,223 B2
(45) Date of Patent: Jan. 17, 2017

(54) SERVER, CLIENT APPARATUS, DATA DISTRIBUTION METHOD, AND DATA DISTRIBUTION SYSTEM

(71) Applicant: SONY COMPUTER ENTERTAINMENT INC., Tokyo (JP)

(72) Inventors: Masayoshi Mizuno, Tokyo (JP); Hideaki Iwaki, Kanagawa (JP); Youji Kita, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 56 days.

(21) Appl. No.: 14/391,049

(22) PCT Filed: Apr. 8, 2013

(86) PCT No.: PCT/JP2013/002402
§ 371 (c)(1),
(2) Date: Oct. 7, 2014

(87) PCT Pub. No.: WO2013/157220
PCT Pub. Date: Oct. 24, 2013

(65) Prior Publication Data
US 2015/0350745 A1 Dec. 3, 2015

(30) Foreign Application Priority Data

Apr. 16, 2012 (JP) ................. 2012-093331

(51) Int. Cl.
*H04N 21/234* (2011.01)
*H04N 21/6373* (2011.01)
(Continued)

(52) U.S. Cl.
CPC .......... *H04N 21/6373* (2013.01); *H04H 20/02* (2013.01); *H04H 60/27* (2013.01);
(Continued)

(58) Field of Classification Search
None
See application file for complete search history.

(56) References Cited

U.S. PATENT DOCUMENTS

2005/0169181 A1*  8/2005  Kim ................. H04N 21/23608
                                                          370/235
2007/0189315 A1*  8/2007  Aoyanagi ........ H04N 21/23406
                                                          370/412
(Continued)

FOREIGN PATENT DOCUMENTS

| JP | 03-058543 | 3/1991 |
| JP | 2004-320302 A | 11/2004 |
| JP | 2005-210196 | 8/2005 |

OTHER PUBLICATIONS

International Search Report dated May 14, 2013, from the corresponding PCT/JP2013/002402.
(Continued)

*Primary Examiner* — Cai Chen
(74) *Attorney, Agent, or Firm* — Katten Muchin Rosenman LLP

(57) ABSTRACT

A reception unit receives data whose bit rate varies. A signal processing section 118 converts the data received by the reception unit into data of a data format to be transmitted to a client apparatus and stores the data obtained by the conversion into a buffer 120. When data is stored by a given amount into the buffer 120, a transmission section streaming-distributes the data to the client apparatus. A control section 126 additionally stores, when data is not stored by the given amount into the buffer 120 in a given transmission period, dummy data into the buffer 120 until the given amount is reached, and controls the transmission section to transmit the resulting data.

8 Claims, 10 Drawing Sheets

(51) Int. Cl.
*H04L 29/06* (2006.01)
*H04L 29/08* (2006.01)
*H04N 21/2368* (2011.01)
*H04H 20/02* (2008.01)
*H04H 60/27* (2008.01)
*H04N 21/236* (2011.01)
*H04N 21/2389* (2011.01)
*H04N 21/2747* (2011.01)
*H04N 21/44* (2011.01)
*H04H 20/42* (2008.01)

(52) U.S. Cl.
CPC ...... *H04L 67/1097* (2013.01); *H04L 67/2842* (2013.01); *H04L 67/42* (2013.01); *H04N 21/2368* (2013.01); *H04N 21/23406* (2013.01); *H04N 21/23611* (2013.01); *H04N 21/23895* (2013.01); *H04N 21/2747* (2013.01); *H04N 21/44004* (2013.01); *H04H 20/42* (2013.01)

(56) References Cited

U.S. PATENT DOCUMENTS

| | | | | |
|---|---|---|---|---|
| 2008/0017137 A1* | 1/2008 | VanHoose | ............... | F02B 43/12 123/3 |
| 2008/0107137 A1* | 5/2008 | Yasui | ................... | H04J 3/0632 370/516 |

OTHER PUBLICATIONS

Notification of Reasons for Refusal dated May 7, 2013, from the corresponding Japanese Application No. JP 2012-093331.
Decision of Refusal dated Nov. 26, 2013, from the corresponding Japanese Application No. JP 2012-093331.
Ryoichi Kawada, "Feature 1 Understanding Video Systems in Hi-Vision Age, Chapter 3 Guide to Slection of MPEG Data Configurations Suited to Transmission Paths and Development Systems," Design Wave Magazine, Aug. 2006 (vol. 11, No. 8), Aug. 1, 2006, CQ Publishing Co., Ltd., pp. 41 through 46.
Masaya Suzuki, "TMPGEnc 3.0 Official Guide", the first edition, Aug. 24, 2004, ASCII Corporation, pp. 278 to 281, ISBN: 4-7561-4507-8.
Ryoichi Kawada, Tokushu 1 High Vision Jidai no Video System o Rikai suru chapter 3 Densoro ya Kaihatsu ni Atta MPEG Data Kosei Sentaku no Tebiki, Design Wave Magazine, Aug. 1, 2006 (Aug. 1, 2006), vol. 11, No. 8, pp. 41 to 46.
Masaya Suzuki, "TMPGEnc 3.0 Official Guide", 1st edition, Ascii Corp., Aug. 24, 2004 (Aug. 24, 2004), ISBN: 4-7561-4507-8., pp. 278 to 281.
Translation of International Preliminary Report on Patentability dated May 14, 2013 from corresponding Application No. PCT/JP2013/002402.

* cited by examiner

SERVER, CLIENT APPARATUS, DATA DISTRIBUTION METHOD, AND DATA DISTRIBUTION SYSTEM

TECHNICAL FIELD

The present invention relates to a data distribution technology for a server, a client apparatus, and a data distribution system which includes the server and the client apparatus.

BACKGROUND ART

In recent years, it has become popular to construct a storage system, wherein a NAS (Network Attached Storage) is connected to a computer network, in the home. The NAS is a file server which includes a hard disk drive and provides a content file to a client apparatus through a TCP/IP network.

Among such NASs, some NAS includes a tuner compatible with both of terrestrial digital broadcasting and satellite digital broadcasting, and a user can live-view a program on the client apparatus through the TCP/IP network and view a recorded program.

SUMMARY

Technical Problem

When a user live-views a program streaming-distributed through a TCP/IP network, transmission or reproduction is executed after a given amount of data is buffered, for example, in order to absorb a variation of the bit rate of streaming data. Therefore, time is required after the user issues a request for viewing of a program from a client apparatus to a server until reproduction is actually started.

Also when the user changes over the channel for a program during live-viewing of a program streaming-distributed through the TCP/IP network, time is required until a program after the changeover is reproduced. This may cause the user to feel bothered.

The present invention has been made in view of such a problem as described above, and it is an object of the present invention to provide a technology for reducing the time required after a request for data distribution until reproduction is started in a server-client system.

Solution to Problem

In order to solve the problem described above, a server according to a certain mode of the present invention includes a reception unit configured to receive data whose bit rate varies, a signal processing section configured to convert the data received by the reception unit into data of a data format to be transmitted to a client apparatus and store the data of the data format into a buffer, a transmission section configured to streaming-distribute, after a given amount of data is stored into the buffer, the data to the client apparatus, and a control section configured to additionally store, when data is not stored by the given amount into the buffer in a given transmission period, dummy data into the buffer until the given amount is reached, and control the transmission section to transmit the resulting data.

Another mode of the present invention is a client apparatus. The apparatus includes a reception section configured to receive streaming data transmitted at a bit rate at least a given bit rate from the server described above and having dummy data inserted therein, a decoding section configured to decode the data received by the reception section, and a demultiplexing section configured to discard the dummy data in the data decoded by the decoding section and demultiplex video data and audio data from the data.

A further mode of the present invention is a data distribution system. The system includes the server described above; the client apparatus described above; and a network configured to communicate data between the server and the client apparatus therethrough. Here, the server streaming-distributes data to the client apparatus determining a bit rate obtained by dividing the given amount by the given transmission period as a lower limit.

A still further mode of the present invention is a data distribution method. The method causes a processor to execute a step of receiving data whose bit rate varies, a step of converting the received data into data of a data format to be transmitted to a client apparatus and storing the data of the data format into a buffer, a step of additionally storing, when data is not stored by a given amount into the buffer in a given transmission period, dummy data until data is stored by the given amount into the buffer, and a step of streaming-distributing, after data is stored by the given amount into the buffer, the data to the client apparatus.

Also a yet further embodiment of the present invention is a data distribution method. The method includes a step of receiving, by a processor of a server, data whose bit rate varies, a step of converting, by the processor of the server, the received data into data of a data format to be transmitted to a client apparatus and storing the data of the data format into a buffer, a step of additionally storing, by the processor of the server, when data is not stored by a given amount into the buffer in a given transmission period, dummy data until data is stored by the given amount into the buffer, and a step of streaming-distributing, by the processor of the server, after data is stored by the given amount into the buffer, the data to the client apparatus, and a step of receiving, by a processor of the client apparatus, the data streaming-distributed from the server, a step of decoding, by the processor of the client apparatus, the received data, and a step of demultiplexing, by the processor of the client apparatus, video data and audio data from data obtained by discarding the dummy data in the decoded data.

A yet further mode of the present invention is a program for causing a computer to implement the steps of any of the data distribution methods.

The program may be provided as part of firmware incorporated in an apparatus in order to perform basic control of hardware resources such as a video or audio decoder. The firmware is stored in a semiconductor memory such as, for example, a ROM (Read Only Memory) or a flash memory in the apparatus. In order to provide the firmware, or in order to update part of the firm ware, a computer-readable recording medium on which the program is recorded may be provided, or the program may be transmitted by a communication line.

It is to be noted that arbitrary combinations of the components described hereinabove and the representations of the present invention which are transformed between a method, an apparatus, a system, a computer program, a data structure, a recording medium and so forth are effective as modes of the present invention.

Advantageous Effect of Invention

According to the present invention, the time required after a request for data distribution is issued until reproduction is started can be reduced in a server-client system.

DESCRIPTION OF EMBODIMENTS

Figure 1:
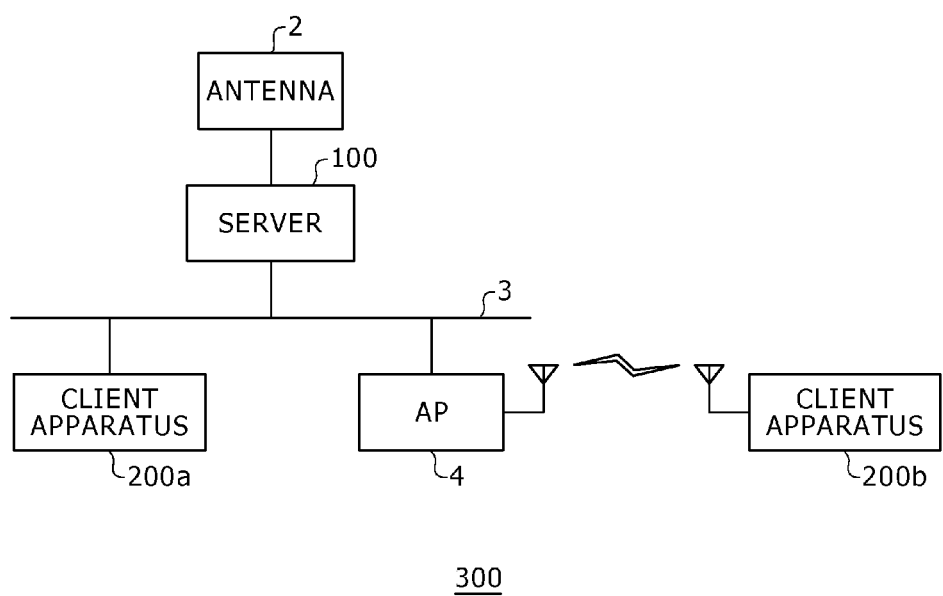
FIG. 1 is a view schematically depicting a general configuration of a data distribution system according to an embodiment.

FIG. 1 is a view schematically depicting a general configuration of a data distribution system 300 according to an embodiment. The data distribution system according to the embodiment includes an antenna 2, a server 100, a plurality of client apparatus collectively referred to as client apparatus 200, an access point (Access Point; AP) 4, and a network 3 which is a transmission path of data.

The antenna 2 receives digital broadcasts such as terrestrial digital broadcasts and satellite digital broadcasts. The server 100 includes a three-wave tuner for a terrestrial digital broadcast, a BS digital broadcast and a CS digital broadcast, and live-distributes a program to the client apparatus 200 through the network 3 serving as a transmission path. The server 100 includes also a storage and functions also as a NAS which provides a recorded program to the client apparatus 200. It is to be noted that, in the present specification, live distribution wherein a digital broadcast received by the antenna 2 is distributed to a client apparatus immediately or to record a digital broadcast received by the antenna 2 into the storage is sometimes referred to as "live reception." Details of a configuration of the server 100 and the client apparatus 200 are hereinafter described.

Although two client apparatus 200 including client apparatus 200a and 200b are depicted in FIG. 1, the number of client apparatus 200 which can communicate with the server 100 is not limited to two but may be greater or smaller than two. The client apparatus 200 are compatible with the DLNA (Digital Living Network Alliance) and can access the server 100 to acquire a recorded program and reproduce the program. It is to be noted that the client apparatus 200b in FIG. 1 is, for example, a portable information terminal and can communicate with the server 100 by wireless communication through the access point 4.

Figure 2:
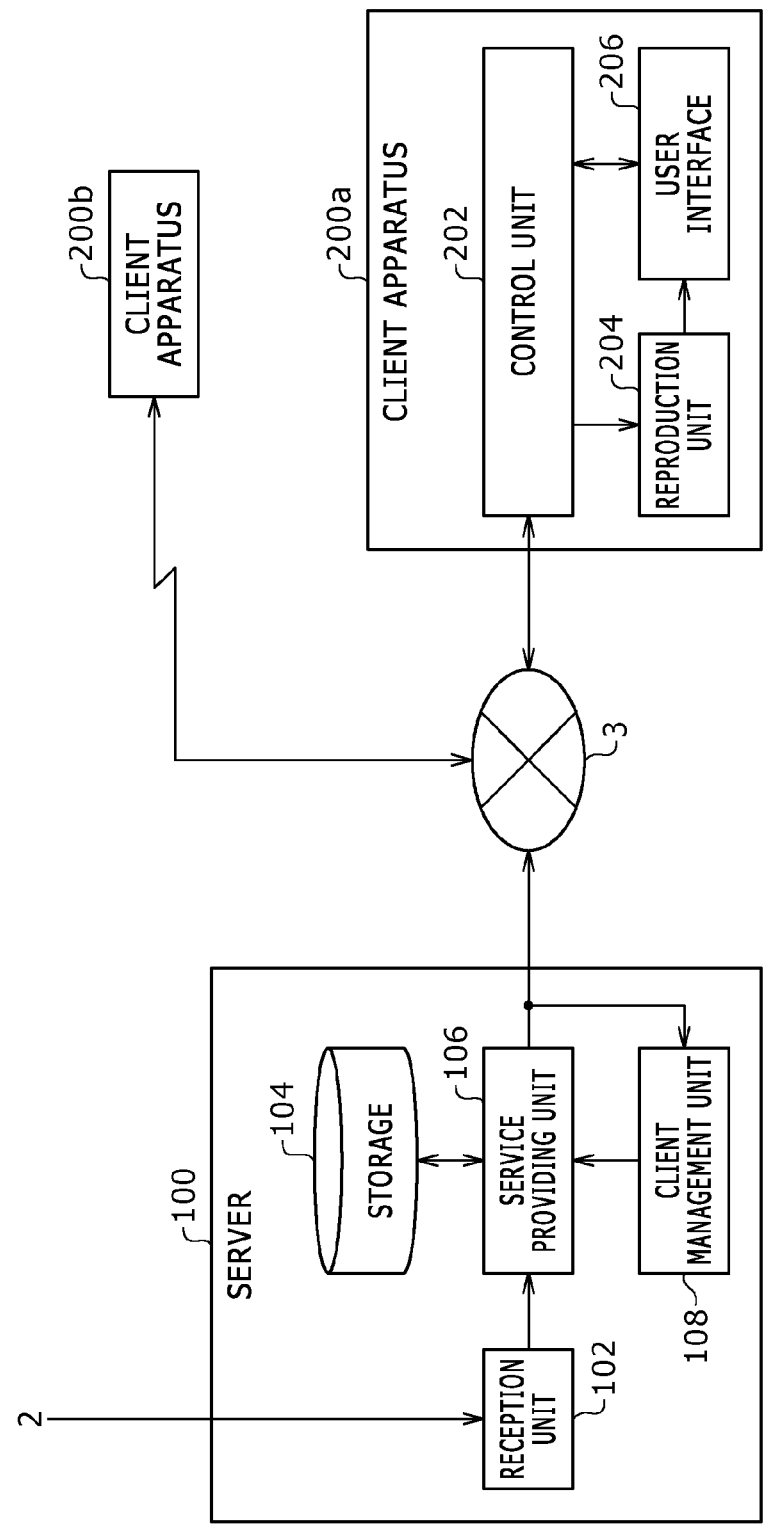
FIG. 2 is a view schematically depicting an internal configuration of a server and a client apparatus according to the embodiment.

FIG. 2 is a view schematically depicting an internal configuration of the server 100 and the client apparatus 200 according to the embodiment. The server 100 includes a reception unit 102, a storage 104, a service providing unit 106 and a client management unit 108. The client apparatus 200 are connected to the server 100 through the network 3. Each of the client apparatus 200 includes a control unit 202 which comprehensively controls operation of the client apparatus 200, a reproduction unit 204 which reproduces program data received from the server 100, and a user interface 206.

The reception unit 102 is a three-wave tuner described hereinabove and demodulates a digital broadcasting wave to restore a signal wave. The client management unit 108 is connected to one or more client apparatus 200 through the network 3 and acquires a request for a service to be provided by the server 100 from a client apparatus 200 which is currently connected to the server 100. The service providing unit 106 provides, in response to a service provision request from a client apparatus 200 acquired by the client management unit 108, at least one service from among services of live distribution of a digital broadcast, distribution of recorded data and movement of recorded data to a different apparatus. To this end, the service providing unit 106 produces program data from a signal demodulated by the reception unit 102 and records the program data into the storage 104 or distributes the program data to the client apparatus 200.

Figure 3:
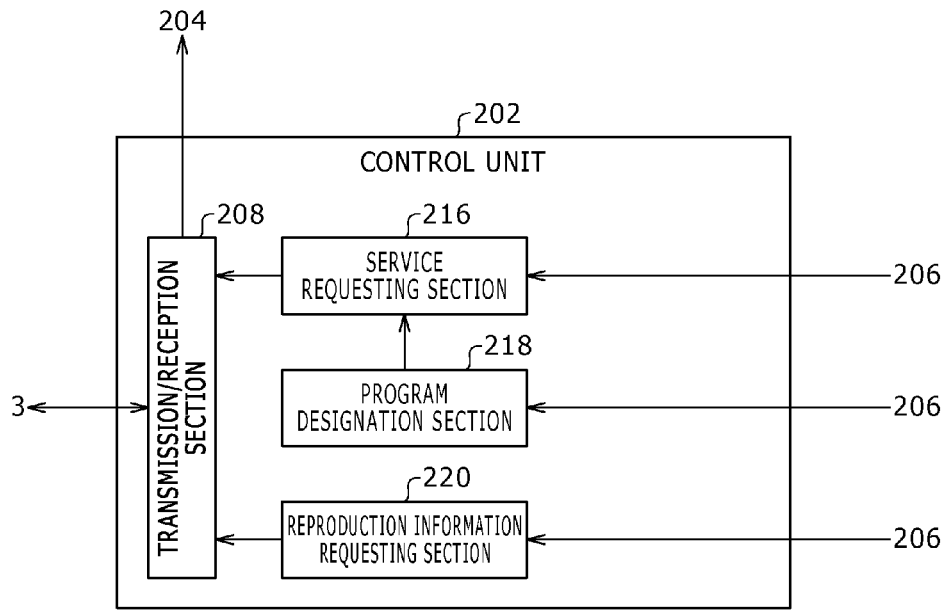
FIG. 3 is a view schematically depicting an internal configuration of a control unit in the client apparatus according to the embodiment.

FIG. 3 is a view schematically depicting an internal configuration of the control unit 202 in the client apparatus 200 according to the embodiment. The control unit 202 in the embodiment includes a transmission/reception section 208, a service requesting section 216, a program designation section 218 and a reproduction information requesting section 220.

The transmission/reception section 208 communicates information with the server 100 through the network 3. The transmission/reception section 208 can be implemented using a known communication module such as, for example, a Wi-Fi (registered trademark) module. The service requesting section 216 issues a request for provision of a service such as live reception of a digital broadcast, movement of registered data or the like to the server 100 through the transmission/reception section 208. It is to be noted that the program designation section 218 and the reproduction information requesting section 220 are hereinafter described.

(Lower Limit Assurance of the Bit Rate)

The server 100 and the client apparatus 200 are compatible with the DLNA. When each client apparatus 200 is to live-view a digital broadcast received by the server 100, the client apparatus 200 receives program data streaming-distributed from the server 100 through the network 3. At this time, the STC (System Time Clock) of data received by the server 100 and the STC of the client apparatus 200 are synchronized with each other.

The server 100 receives a digital broadcast, encodes the digital broadcast in accordance with a standard such as, for example, MPEG (Moving Picture Experts Group) 2 to produce program data. At this time, the data amount after the encoding sometimes fluctuates depending upon the structure of video data which configure the program. As a result, the bit rate of program data to be streaming-distributed from the server 100 to the client apparatus 200 sometimes changes, and depending upon the structure of the video data, also a period within which the bit rate drops significantly may possibly occur.

Normally, when program data is to be transferred to a client apparatus 200, the server 100 transfers the program data in a unit of a block having a given data amount. Data is not transferred until data is stored by the unit of a block into a transmission buffer in the server 100. In this case, if the bit rate drops significantly, then the timing at which transfer of the unit of a block is to be carried out sometimes delays, and a situation wherein video and audio are temporality disordered may possibly occur. It is possible to deal with the delay of the timing by delaying the STC of the client apparatus 200 with respect to the STC on the broadcasting side. However, if the delay of the timing is dealt with in this manner, then this may cause a problem that the timing of starting of reproduction is delayed from the timing of channel changeover.

Thus, a principle of assuring a lower limit to the bit rate of program data to be transmitted from the server 100 to the client apparatus 200 is described.

Figure 4:
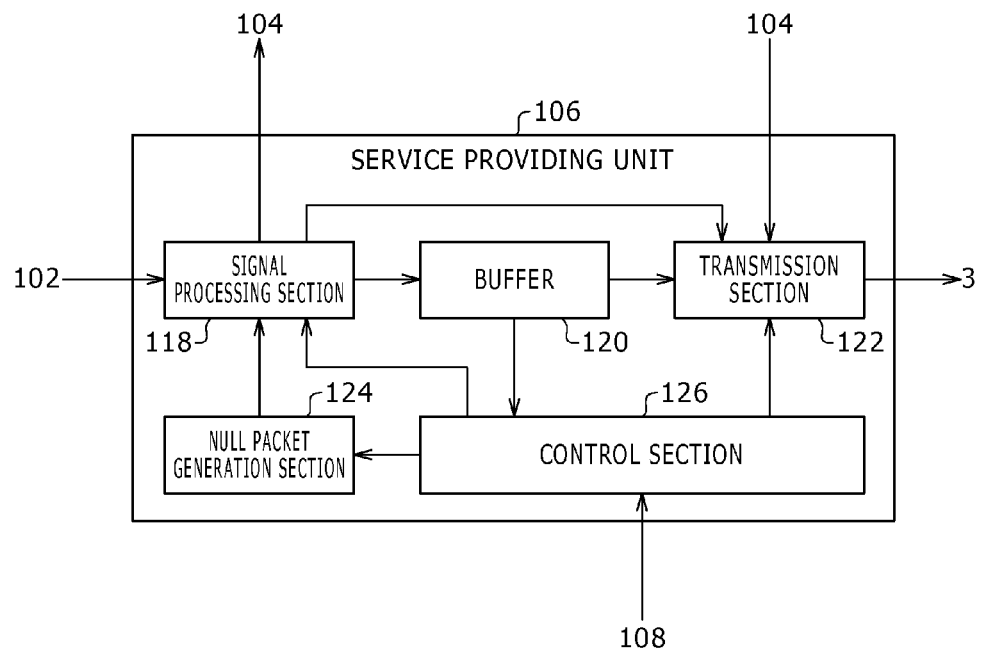
FIG. 4 is a view schematically depicting an internal configuration of a service providing unit in the server according to the embodiment.

FIG. 4 is a view schematically depicting an internal configuration of the service providing unit 106 in the server 100 according to the embodiment. The service providing unit 106 in the embodiment includes a signal processing section 118, a buffer 120, a transmission section 122, a null packet generation section 124 and a control section 126.

The signal processing section 118 converts digital broadcasting data received by the reception unit 102 into data of the MPEG2 data format to be transmitted to a client apparatus and stores the data of the data format into the buffer 120. The transmission section 122 streaming-distributes, when a given amount of data is stored in the buffer 120, the stored program data to the client apparatus 200. Here, the "given amount" is a unit data amount when data is to be transmitted from the transmission section 122 to a client apparatus and may be determined through an experiment taking the configuration of the data distribution system 300 and so forth into consideration. The "given amount" is, for example, a data amount which can be stored into the buffer 120. In the following description, the data size of the given amount is represented by "S."

The control section 126 controls the transmission section 122 to streaming-distribute program data in response to a request for live distribution from the client management unit 108. Here, if data is not stored by the given amount into the buffer 120 in a given transmission period, then the control section 126 adds dummy data in a given transmission period until data is stored by the given mount. Here, the "given transmission period" is a maximum value of the period after which data is distributed by the transmission section 122, and is, to the client apparatus 200, a maximum delay time period of data. In the following description, the given transmission period is represented by "L."

Further, the "dummy data" is temporary data for increasing the data amount of the buffer 120 in the given transmission period. Although any data may be applied as the dummy data only if it can be identified from program data, the service providing unit 106 in the embodiment implements the dummy data using a null packet produced by the null packet generation section 124. When data is not stored by the given amount S into the buffer 120 in the given transmission period L, the control section 126 controls the null packet generation section 124 to produce a null packet until data is stored by the given amount S into the buffer 120.

On the other hand, when program data is stored by the given amount S into the buffer 120 in the given transmission period L, the control section 126 does not control the null packet generation section 124 to produce a null packet. At a point of time at which program data is stored by the given amount S into the buffer 120, the transmission section 122 transmits the program data to the client apparatus 200. Consequently, the transmission section 122 transmits data to the client apparatus 200 at intervals of the transmission period L at the longest. Since the amount of data transmitted by a single transmission operation is the given amount S, the value of S/L is a lower limit value $R_{min}$ to the bit rate. This is because, if program data is stored by the given amount S into the buffer 120 in the given transmission period L, then the data of the given amount S is transmitted in a period L' shorter than L, $S/L'>R_{min}$ is satisfied.

Figure 5:
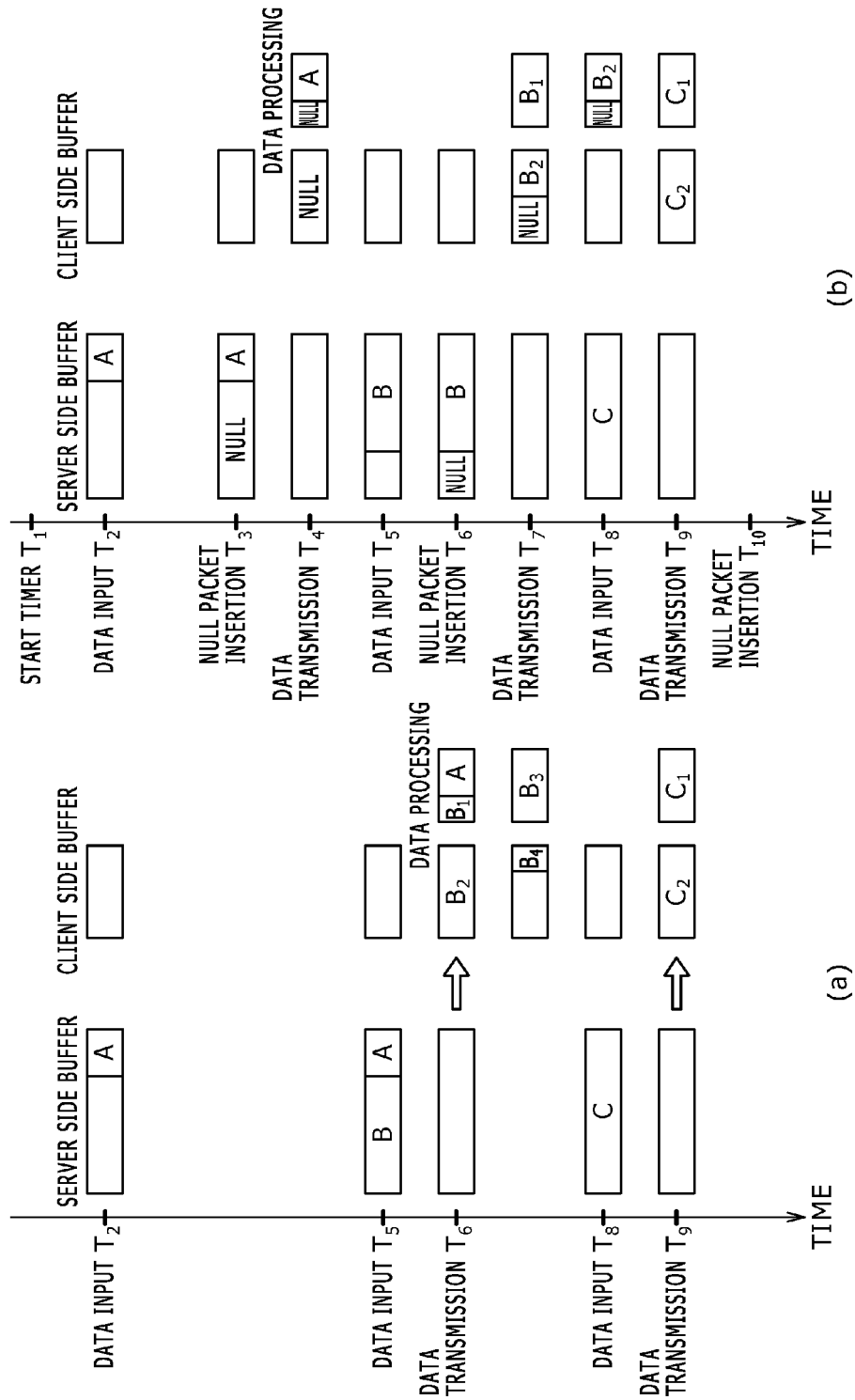
FIGS. 5(a) and 5(b) are views illustrating delay compensation for a low bit rate delay.

FIG. 5 is a view illustrating a principle of the lower limit assurance of the bit rate and is a view illustrating delay compensation for a low bit rate delay. In particular, FIG. 5(a) is a view schematically depicting data transfer according to a prior art, and FIG. 5(b) is a view schematically depicting data transfer by the server 100 according to the embodiment.

Referring to FIG. 5(a), although data A is inputted to the buffer 120 at time $T_2$, the size of the data A is smaller than the given amount S, and at this point of time, the data A is not transferred to the client apparatus 200. For a while after that, no data is inputted to the buffer 120, and at time $T_5$, data B is inputted. At the point of time at which the data B is inputted, the amount of data stored in the buffer 120 reaches the given amount S, and therefore, the data is transferred to the client apparatus 200 at time $T_6$ immediately after time $T_5$. In the example illustrated in FIG. 5(a), since the size of the buffer of the client apparatus 200 is smaller than the size of the buffer 120 of the server 100, the server 100 starts processing at a point of time at which the data is transferred thereto from the server 100.

When the data C of an amount equal to the given amount S is inputted to the buffer 120 at time $T_8$, the data is transferred to the client apparatus 200 at time $T_9$ immediately after that. In this manner, in the data transfer according to the prior art, the bit rate relies upon the inputted data amount, and the server 100 cannot control the transmission interval of data. As a result, the maximum delay Lm of data transfer becomes infinite.

In FIG. 5(b) illustrating data transfer by the server 100 according to the embodiment, a timer not depicted in the server 100 is started before time $T_2$ at which the data A is inputted to the buffer 120. After the data A is inputted to the buffer 120 at time $T_2$, at the point of time $T_3$ preceding to time $T_5$ at which the data B is inputted, the transmission period L elapses after the timer is started. Therefore, the control section 126 controls the null packet generation section 124 to generate a null packet until the data amount in the buffer 120 becomes equal to the given amount S. Therefore, at time $T_4$ immediately after that, data is transferred to the client apparatus 200.

Similarly as in the case of the example illustrated in FIG. 5(a), the data B is inputted at time $T_5$. Since the transmission period L elapses again at time $T_6$ before time $T_8$ at which the data C is inputted, the control section 126 controls the null packet generation section 124 to generate a null packet until the data amount in the buffer 120 becomes equal to the given amount S. At time $T_7$ immediately after that, the data is transferred to the client apparatus 200.

When the data C of an amount equal to the given amount S is inputted to the buffer 120 at time $T_8$, data is transferred to the client apparatus 200 at time $T_9$ immediately after that, similarly as in the case of the example illustrated in FIG.

5(a). In this case, the data is transferred after an interval shorter than the transmission period L.

In this manner, even if the amount of data inputted to the buffer 120 and the inputting timing are same, the server 100 according to the embodiment transfers data at a bit rate higher than that by the prior art apparatus. In particular, since the maximum delay time period for data transfer is fixed to the transmission period L, delay assurance for a low bit rate delay can be achieved.

Now, processing of dummy data by the signal processing section 118 is described.

Figure 6:
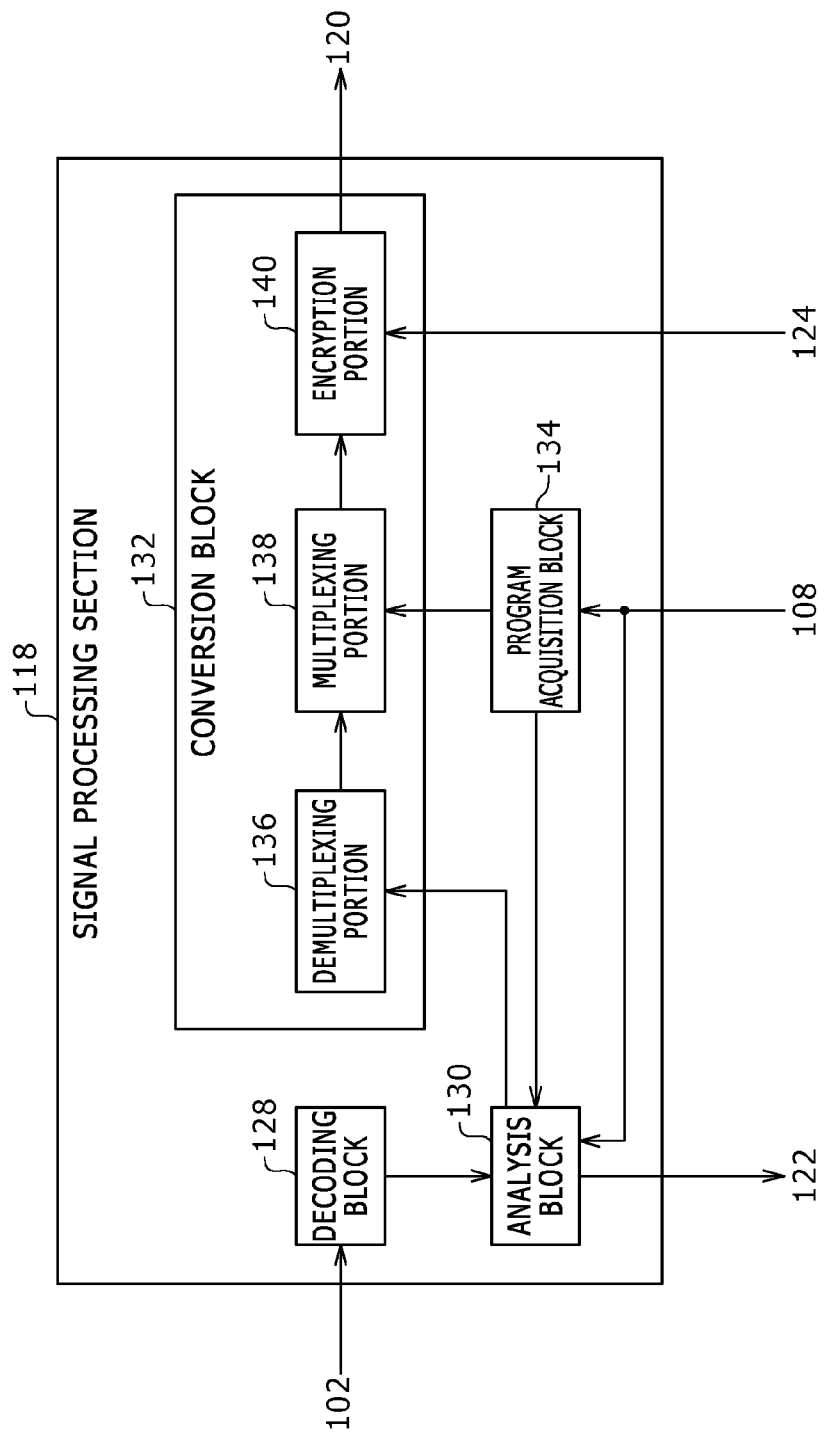
FIG. 6 is a view schematically depicting an internal configuration of a signal processing section in the server according to the embodiment.

FIG. 6 is a view schematically depicting an internal configuration of the signal processing section 118 in the server 100 according to the embodiment. The signal processing section 118 in the embodiment includes a decoding block 128, an analysis block 130, a conversion block 132 and a program acquisition block 134.

As described hereinabove, the reception unit 102 is a tuner which receives digital broadcasting data including a plurality of programs. Digital broadcasting data is normally in an encrypted form. Thus, the decoding block 128 decodes the digital broadcasting data received by the reception unit 102. Since the data decoded by the decoding block 128 includes a plurality of programs, the program acquisition block 134 accepts a designation of a program from a client apparatus 200 through the client management unit 108.

The analysis block 130 extracts, from digital broadcasting data received by the reception unit 102 and including a plurality of programs, reproduction information including program configuration information and synchronization information which is used for reproduction of a program. The conversion block 132 demultiplexes, from the digital broadcasting data received by the reception unit 102, a program acquired by the program acquisition block 134 on the basis of the reproduction information extracted by the analysis block 130 and converts the demultiplexed program into a program of the MPEG2 data format to be transmitted to a client apparatus. To this end, the conversion block 132 includes a demultiplexing portion 136, a multiplexing portion 138 and an encryption portion 140.

The demultiplexing portion 136 is a demultiplexer which demultiplexes, on the basis of program configuration information analyzed by the analysis block 130, video data and audio data of a plurality of programs from data decoded by the decoding block 128. The multiplexing portion 138 is a multiplexer which multiplexes video data and audio data acquired by the program acquisition block 134 from within the data demultiplexed by the demultiplexing portion 136.

As described above, the server 100 and the client apparatus 200 are compatible with the DLNA. Therefore, the encryption portion 140 encrypts data multiplexed by the multiplexing portion 138 in accordance with the DTCP-IP used by the DLNA and stores resulting data into the buffer 120. Here, the control section 126 controls the null packet generation section to produce a null packet and input the null packet to the encryption portion 140. The encryption portion 140 encrypts the null packet produced by the null packet generation section similarly to program data and stores the encrypted null packet into the buffer 120. The data stored in the buffer 120 has been encrypted by the encryption portion 140, and unless the data is decoded, it cannot be distinguished whether or not the data includes a null packet.

Figure 7:
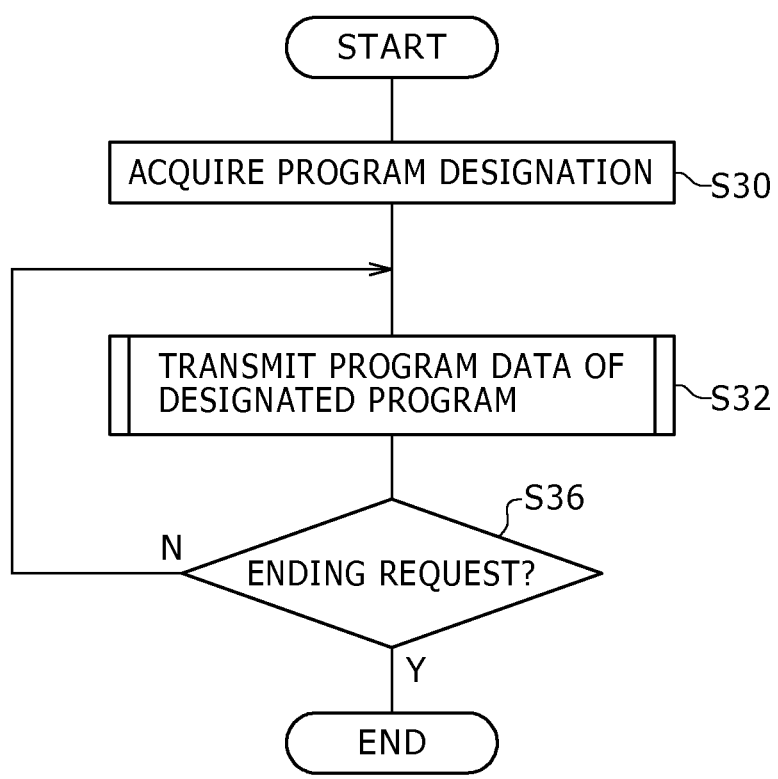
FIG. 7 is a flow chart illustrating a flow of a delay compensation process for a low bit rate delay according to the embodiment.

FIG. 7 is a flow chart illustrating a flow of a delay compensation process for a low bit rate delay in the embodiment. The processing according to the present flowchart is started when a client apparatus 200 transmits a program designation to the server 100.

The client management unit 108 acquires a stream acquisition request for live viewing program designation from the client apparatus 200 (S30). The service providing unit 106 produces program data of the designated program and transmits the program data to the client apparatus 200 (S32).

While a request for ending distribution of program data from the client apparatus 200 is not received (N at S36), the process at step 32 is continued. If an ending request for program data distribution is received from the client apparatus 200 (Y at S36), then the processing of the present flow chart is ended.

Figure 8:
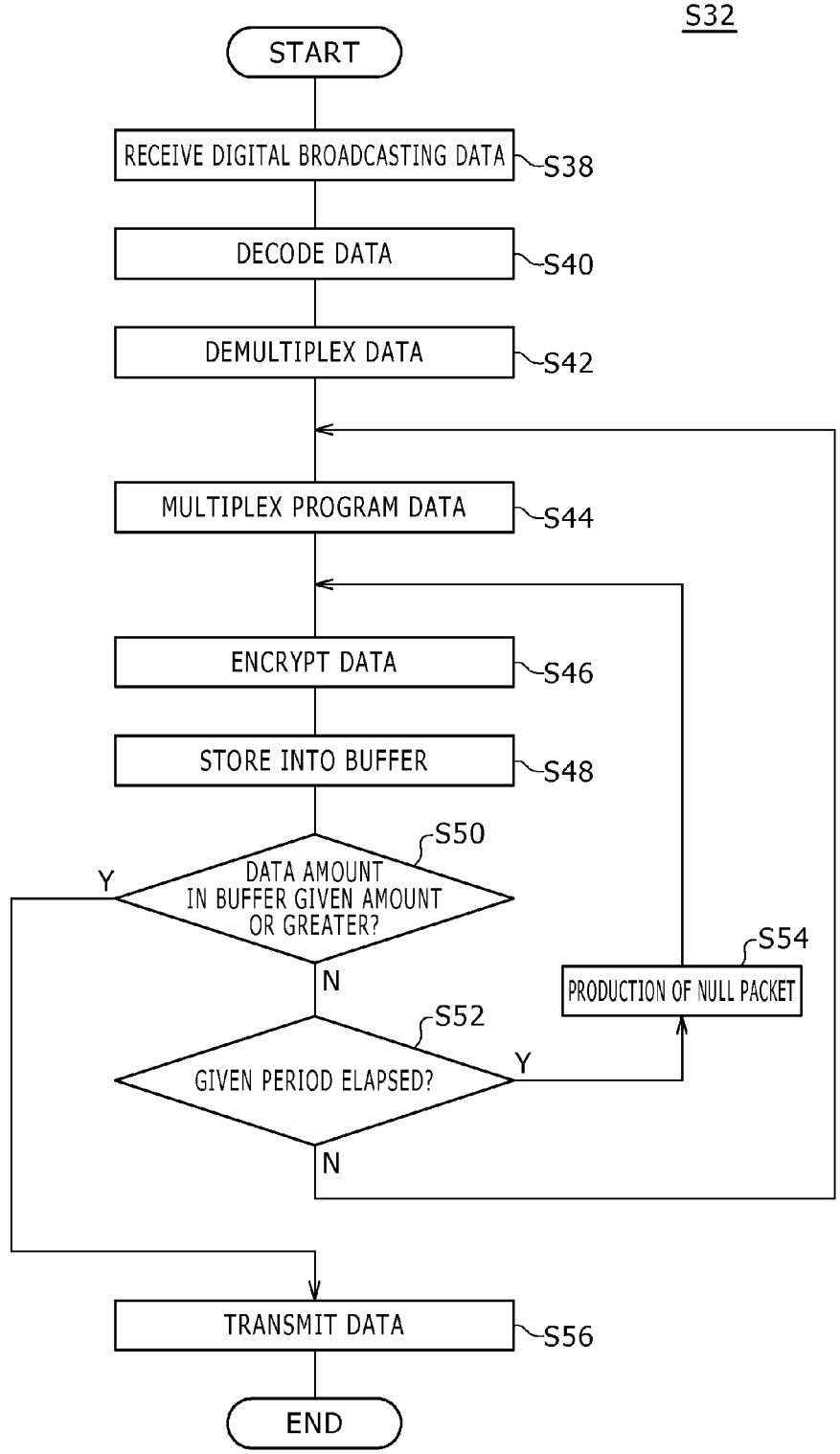
FIG. 8 is a flow chart illustrating a flow of a dummy data insertion process according to the embodiment.

FIG. 8 is a flow chart illustrating a flow of a dummy data insertion process in the embodiment and is a view illustrating step S32 in FIG. 7 in detail.

The reception unit 102 receives digital broadcasting data (S38). The decoding block 128 decodes the data received by the reception unit 102 (S40). The demultiplexing portion 136 demultiplexes program data of channels based on program configuration information analyzed by the analysis block 130 (S42).

The multiplexing portion 138 multiplexes video data and audio data of a designated program based on the program configuration information analyzed by the analysis block 130 to produce program data of the MPEG2 format (S42). The encryption portion 140 encrypts the program data produced by the multiplexing portion 138 in accordance with the DTCP-IP (S46) and stores the encrypted program data into the buffer 120 (S48). While the data amount in the buffer 120 is the given amount S or smaller (N at S50) and a given period of time defined by the transmission period L does not elapse (N at S52), the processes at steps S44 to S48 are repeated.

Even if the data amount in the buffer 120 is the given amount S or smaller (N at S50), if the given period defined by the transmission period L elapses (Y at S52), then the null packet generation section 124 produces a null packet until the data amount in the buffer 120 becomes equal to the given amount S (S52).

If the data amount in the buffer 120 becomes equal to or greater than the given amount S (Y at S50), then the transmission section 122 transmits the data to the client apparatus 200 (S56). After the transmission section 122 transmits the data to the client apparatus 200, the processing according to the present flow chart is ended.

As described above, it becomes possible for the server 100 according to the embodiment to streaming-distribute program data to a client apparatus 200 using the bit rate $R_{min}$ obtained by dividing the given amount S by the given transmission period L as a lower limit. Further, it becomes possible to suppress the maximum time period of the transmission delay by a low bit rate to the fixed value L. By setting the transfer delay by a low bit rate to the fixed value L, the delay of STC of the client apparatus 200 on the receiving side can be suppressed within a certain range, whereby the speed of channel changeover can be raised. As a result, the time required after a request for data distribution is issued until reproduction is started can be reduced.

Since the transmission period L is a processing frequency at the server 100 side, it may be determined by an experiment taking the capacity of the server 100 into consideration together with the given amount S. By this, the transmission period L can be realistically reduced. Further, since the compensation process inserts a null packet only when the buffer 120 is not filled with data, when a program is broadcasted at a bit rate higher than the lowest bit rate $R_{min}$, the transfer bit rate between the server 100 and the client apparatus 200 is not raised carelessly. The load by processing of the client apparatus 200 does not increase, either.

It is to be noted that a function for changing over the delay setting, namely, whether or not a null packet is to be inserted in the given transmission period L, may be changed over in accordance with a request from a client apparatus 200. When the server 100 and a client apparatus 200 communicate with each other in compliance with the standard of the DLNA, the HTTP (Hypertext Transfer Protocol) is used as a communication protocol. The changeover of the delay setting can be implemented by describing the changeover into a request header of the http to be transmitted from the client apparatus 200 to the server.

(Prior Acquisition of Reproduction Information)

A mode in which a lower limit to a bit rate is assured when program data is streaming-distributed from the server 100 to a client apparatus 200 has been described. Now, operation before and after a client apparatus 200 issues a request for distribution of program data to the server 100 is described.

Figure 9:
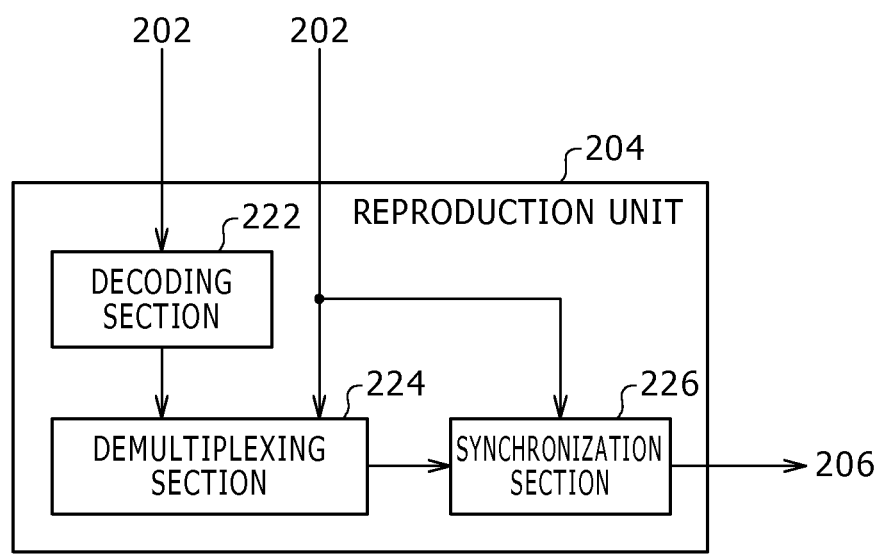
FIG. 9 is a view schematically depicting an internal configuration of a reproduction unit in the client apparatus according to the embodiment.

FIG. 9 is a view schematically depicting an internal configuration of the reproduction unit 204 in the client apparatus 200 according to the embodiment. The reproduction unit 204 in the embodiment includes a decoding section 222, a demultiplexing section 224 and a synchronization section 226.

The transmission/reception section 208 in the control unit 202 depicted in FIG. 3 receives streaming data transmitted at a bit rate equal to or higher than the bit rate $R_{min}$ from the server 100 and having null packets inserted therein as dummy data. The decoding section 222 decodes the data encrypted in accordance with the DTCP-IP and received by the transmission/reception section 208. The demultiplexing section 224 discards null packets in the data decoded by the decoding section 222 and demultiplexes video data and audio data which configure the program data.

The program data distributed from the server 100 includes reproduction information analyzed by the analysis block 130 in the server 100, and the demultiplexing section 224 demultiplexes video data and audio data based on the reproduction information included in streaming-received data. Further, also other data such as caption data can be demultiplexed in addition to the video data and audio data.

Figure 10:
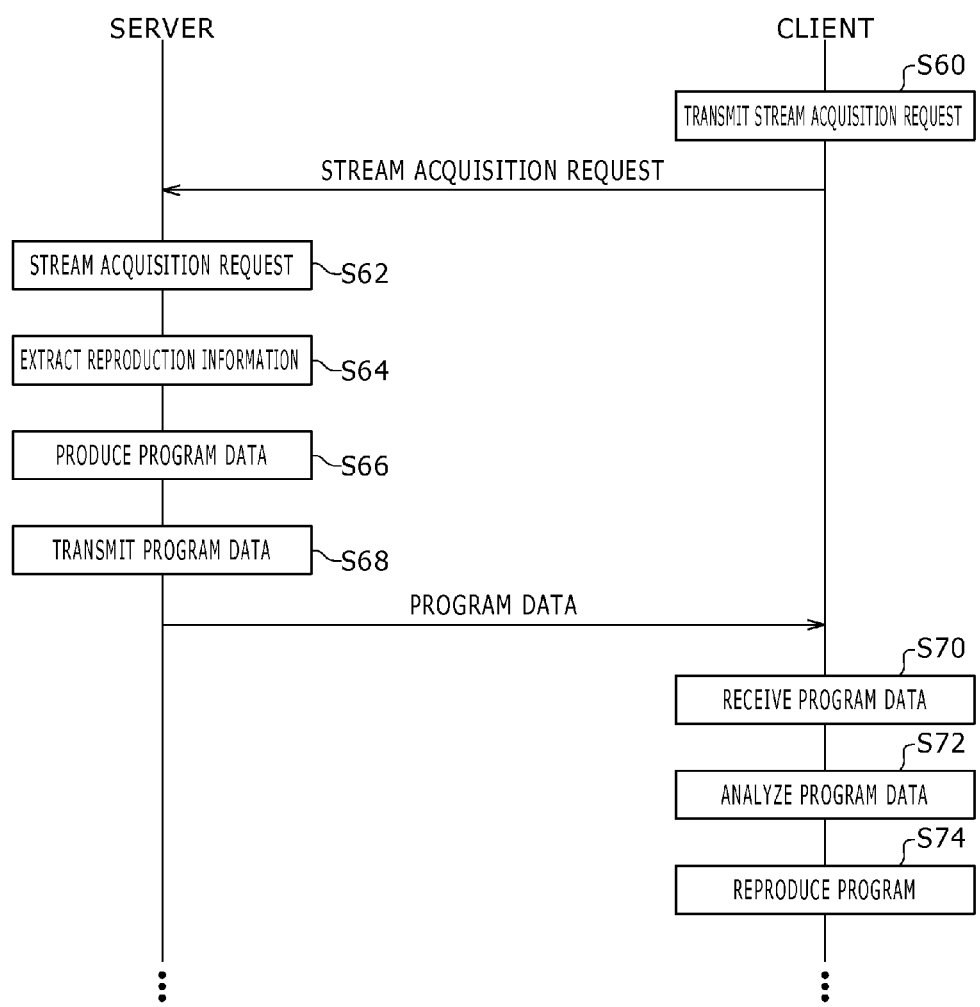
FIG. 10 is a sequence diagram illustrating a program reproduction process of the data distribution system according to a related art.

FIG. 10 is a sequence diagram illustrating a program reproduction process of the data distribution system 300 according to a prior art and is a view illustrating processing when video data and audio data are demultiplexed on the basis of reproduction information included in streaming-received data.

The program designation section 218 (depicted in FIG. 3) in the client apparatus 200 transmits a stream acquisition request, which designates a program to be extracted from digital broadcasting data including a plurality of programs and distributed, to the server 100 (S60). The program acquisition block 134 (depicted in FIG. 6) in the server 100 acquires the stream acquisition request from the program designation section 218 (S62). The analysis block 130 in the server 100 extracts reproduction information (S62).

The conversion block 132 in the server 100 produces program data designated based on the reproduction information (S66). At this time, the conversion block 132 embeds the reproduction information into the program data. The transmission section 122 (depicted in FIG. 4) in the server 100 transmits the program data produced by the conversion block 132 to the client apparatus 200 (S68).

The transmission/reception section 208 of the client apparatus 200 receives the program data from the server 100 (S70). The demultiplexing section 224 analyzes the program data from the server 100 and extracts the reproduction information (S72). The demultiplexing section 224 demultiplexes the video data and the audio data based on the extracted reproduction information and the synchronization section 226 reproduces the video data and the audio data in synchronism with each other.

As described hereinabove, data distributed from the server 100 is subject to a delay whose maximum value is the transmission period L. In order to analyze the reproduction information included in the streaming-received data, normally a period of time of approximately several 100 milliseconds is required, and this time period appears every time the channel is changed. Therefore, the time required for the analysis of the reproduction information may have an influence much upon the time period for channel changeover. As occasion demands, it may occur that data received while reproduction information is analyzed is discarded.

The inventor of the present application recognized the possibility that the time required for analysis of reproduction information may be omitted by acquiring reproduction information obtained by an analysis by the analysis block 130 in the server 100 in prior to program data. In the following, prior acquisition of reproduction information by the client apparatus 200 is described.

The program designation section 218 in the control unit 202 depicted in FIG. 3 designates, to the server 100, a program to be extracted from within digital broadcasting data including a plurality of programs and distributed. The reproduction information requesting section 220 issues a request for reproduction information, which is to be referred to upon reproduction of program data to be distributed from the server 100, to the server 100 independently of the program designation by the program designation section 218.

The transmission section 122 in the server 100 transmits the program data to the client apparatus 200 and transmits, in accordance with the reproduction information request from the reproduction information requesting section 220, the reproduction information extracted by the analysis block 130 independently of the program data. More particularly, when a request for reproduction information is received from the reproduction information requesting section 220, the analysis block 130 outputs the reproduction information to the transmission section 122 at a point of time at which extraction of the reproduction information is completed. The transmission section 122 transmits the reproduction information acquired from the analysis block 130 to the client apparatus 200 in prior to transmission of the program data obtained by conversion by the conversion block 132.

The transmission/reception section 208 in the client apparatus 200 receives the data distributed from the server 100. The demultiplexing section 224 extracts video information and audio information from the program data on the basis of the program configuration information included in the reproduction information acquired by the transmission/reception section 208. The synchronization section 226 reproduces the video information and the audio information demultiplexed by the demultiplexing section 224 in synchronism with each other on the basis of synchronization information included in the reproduction information.

As described hereinabove, the communication of data between the server 100 and each client apparatus 200 is implemented utilizing the HTTP. Therefore, the transmission/reception section 208 in the client apparatus 200 performs reception of program data distributed from the server 100 and reception of reproduction information extracted by the server 100 establishing sessions different from each other. Consequently, it is possible to receive the reproduction information independently of and in prior to the program data.

Figure 11:
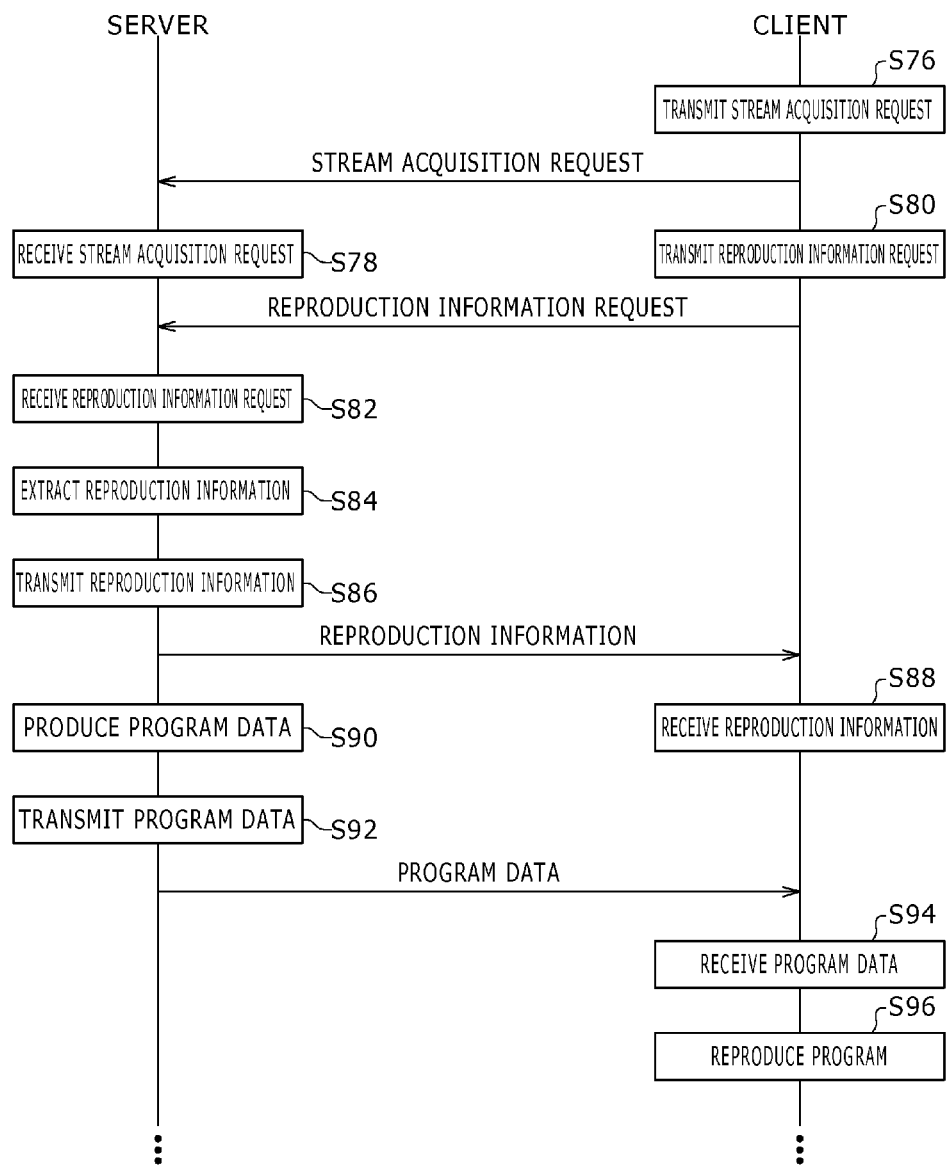
FIG. 11 is a sequence diagram illustrating a program reproduction process of the data distribution system according to the embodiment.

FIG. 11 is a sequence diagram illustrating a program reproduction process of the data distribution system 300 according to the embodiment.

The program designation section 218 in a client apparatus 200 transmits, to the server 100, a stream acquisition request for causing the server 100 to extract a program from digital broadcasting data including a plurality of programs and distribute the program (S76). The program acquisition block 134 in the server 100 acquires the stream acquisition request from the program designation section 218 (S78). The reproduction information requesting section 220 in the client apparatus 200 issues a request to the server 100 to transmit reproduction information independently of the program designation by the program designation section 218 (S80).

The analysis block 130 in the server 100 acquires a transmission request for reproduction information to the client management unit 108 (S82). Then, the analysis block 130 extracts reproduction information (S84). The transmission section 122 in the server 100 transmits the reproduction information extracted by the analysis block 130 to the client apparatus 200 in prior to program data (S86). The transmission/reception section 208 of the client apparatus 200 receives the reproduction information from the server 100 in prior to the program data (S88).

The conversion block 132 in the server 100 produces designated program data on the basis of the reproduction information analyzed by the analysis block 130 (S90). The transmission section 122 in the server 100 transmits the program data produced by the conversion block 132 to the client apparatus 200 (S92).

The transmission/reception section 208 of the client apparatus 200 receives the program data from the server 100 (S94). The demultiplexing section 224 demultiplexes video data and audio data from the program data on the basis of the reproduction information received in advance and the synchronization section 226 reproduces the video data and the audio data in synchronism with each other (S96).

As described above, with the data distribution system 300 according to the embodiment, any client apparatus 200 can acquire reproduction information prior to reception of program data. The client apparatus 200 can acquire the reproduction information substantially at the same time with or prior to acquisition of the program data from the server and can omit the period of time required for analysis of the reproduction information. As a result, the client apparatus 200 can start decoding of a video-audio stream without discarding the stream being analyzed. As a result, the period of time required after a request for data distribution or channel changeover is issued until reproduction is started can be reduced.

As described above, with the data distribution system 300 according to the embodiment, the period of time required after a request for data distribution is issued until reproduction is started can be reduced in a server-client system.

The present invention has been described in connection with the embodiment. The embodiment is exemplary and can be modified in various manners in a combination of the various components and processes, and it is recognized that also such modifications fall within the scope of the present invention.

(Modification)

In the foregoing description, it is described that the conversion block 132 demultiplexes, on the basis of reproduction information extracted by the analysis block 130, a program acquired by the program acquisition block 134 from within digital broadcasting data received by the reception unit 102. Further, it is described that the conversion block 132 converts the program into a program of the MPEG2 data format to be transmitted to a client apparatus. In addition, the conversion block 132 may transcode the digital broadcasting data received by the reception unit 102. This can be implemented by placing information to be used for transcoding into program configuration information and causing a transcoding execution unit (not depicted) to transcode the digital broadcasting data on the basis of the information for the transcoding.

With the modification, it is possible to reduce the amount of data to be transmitted, for example, when data is to be transmitted from the server 100 to the client apparatus 200 using a communication path whose bandwidth is narrow, when the display region of the client apparatus 200 is small or in a like case.

It is to be noted that the invention of the present application may be specified also by items given below.

[Item 1-1]

A server, including:

a reception unit configured to receive data whose bit rate varies;

a signal processing section configured to convert the data received by the reception unit into data of a data format to be transmitted to a client apparatus and store the data of the data format into a buffer;

a transmission section configured to streaming-distribute, after a given amount of data is stored into the buffer, the data to the client apparatus; and a control section configured to additionally store, when data is not stored by the given amount into the buffer in a given transmission period, dummy data into the buffer until the given amount is reached, and control the transmission section to transmit the resulting data.

[Item 1-2]

The server according to item 1-1, further including a null packet generation section configured to produce a null packet as the dummy data;

the control section controlling, when data is not stored by the given amount into the buffer in the given transmission period, the null packet generation section to produce a null packet until the data is stored by the given amount into the buffer.

[Item 1-3]

The server according to item 1-2, wherein:

the reception unit is a tuner configured to receive digital broadcasting data including a plurality of programs;

the signal processing section includes a decoding block configured to decode the data received by the reception unit, a program acquisition block configured to accept a designation of a program from the client apparatus, a demultiplexing portion configured to demultiplex video data and audio data of each of the plural programs from the data decoded by the decoding block, a multiplexing portion configured to multiplex the video data and the audio data of the program acquired by the program acquisition block from within the data demultiplexed by the demultiplexing portion, and an encryption portion configured to encrypt the data multiplexed by the multiplexing portion and store the encrypted data into the buffer; and the control section controls, when the data encrypted by the encryption portion is not stored by the given amount into the buffer in the given transmission period, the encryption portion to encrypt the null packet produced by the null packet generation section and store the encrypted null packet into the buffer.

[Item 1-4]

The server according to item 1-3, wherein the control section controls, when the data encrypted by the encryption portion is stored by the given amount into the buffer in the given transmission period, the transmission section to transmit the data stored in the buffer without controlling the null packet generation section to produce a null packet.

[Item 1-5]

A client apparatus, including:
a reception section configured to receive streaming data transmitted at a bit rate equal to or higher than a given bit rate from the server according to any one of items 1-1 to 1-4 and having dummy data inserted therein; a decoding section configured to decode the data received by the reception section; and
a demultiplexing section configured to discard the dummy data in the data decoded by the decoding section and demultiplex video data and audio data from the data.

[Item 1-6]

A data distribution system, including:
the server according to any one of items 1-1 to 1-4;
the client apparatus according to item 1-5; and
a network configured to communicate data between the server and the client apparatus therethrough;
the server streaming-distributing data to the client apparatus determining a bit rate obtained by dividing the given amount by the given transmission period as a lower limit.

[Item 1-7]

A data distribution method, which causes a processor to execute:
a step of receiving data whose bit rate varies;
a step of converting the received data into data of a data format to be transmitted to a client apparatus and storing the data of the data format into a buffer;
a step of additionally storing, when data is not stored by a given amount into the buffer in a given transmission period, dummy data into the buffer until the given amount is reached; and
a step of streaming-distributing, after data is stored by the given amount into the buffer, the data to the client apparatus.

[Item 1-8]

A program, which causes a computer to implement:
a function for receiving data whose bit rate varies;
a function for converting the received data into data of a data format to be transmitted to a client apparatus and storing the data of the data format into a buffer;
a function for additionally storing, when data is not stored by a given amount into the buffer in a given transmission period, dummy data into the buffer until the given amount is reached; and
a function for streaming-distributing, after data is stored by the given amount into the buffer, the data to the client apparatus.

[Item 1-9]

A data distribution method, including:
a step of receiving, by a processor of a server, data whose bit rate varies;
a step of converting, by the processor of the server, the received data into data of a data format to be transmitted to a client apparatus and storing the data of the data format into a buffer;
a step of additionally storing, by the processor of the server, when data is not stored by a given amount into the buffer in a given transmission period, dummy data into the buffer until the given amount is reached; and
a step of streaming-distributing, by the processor of the server, after data is stored by the given amount into the buffer, the data to the client apparatus; and
a step of receiving, by a processor of the client apparatus, the data streaming-distributed from the server;
a step of decoding, by the processor of the client apparatus, the received data; and
a step of demultiplexing, by the processor of the client apparatus, video data and audio data from data obtained by discarding the dummy data in the decoded data.

[Item 2-1]

A server, including:
a reception unit configured to receive digital broadcasting data including a plurality of programs;
an analysis block configured to extract, from the data received by the reception unit, reproduction information including program configuration information and synchronization information to be used for reproduction of a program;
a program acquisition block configured to acquire a designation of a program from a client apparatus;
a conversion block configured to demultiplex, on the basis of the reproduction information extracted by the analysis block, the program acquired by the program acquisition block from the digital broadcasting data received by the reception unit and convert the program into a program of a data format to be transmitted to the client apparatus; and
a transmission section configured to transmit the program data obtained by the conversion by the conversion block to the client apparatus and transmit, in response to a request from the client apparatus, the reproduction information extracted by the analysis block to the client apparatus independently of the program data.

[Item 2-2]

The server according to item 2-1, wherein the transmission section transmits the reproduction information extracted by the analysis block to the client apparatus prior to the transmission of the program data obtained by the conversion by the conversion block.

[Item 2-3]

The server according to item 2-1 or 2-2, wherein the conversion block transcodes, on the basis of the reproduction information extracted by the analysis block, the program acquired by the program acquisition block from the digital broadcasting data received by the reception unit.

[Item 2-4]

A transmission method, which causes a processor to execute:
a step of receiving digital broadcasting data including a plurality of programs;
a step of extracting, from the received digital data, reproduction information including program configuration information and synchronization information to be used for reproduction of a program;
a step of acquiring a designation of a program from a client apparatus;
a step of separating, on the basis of the extracted reproduction information, the program designated by the client apparatus from the received digital broadcasting data and converting the program into a program of a data format to be transmitted to the client apparatus; and
a step of transmitting the program data obtained by the conversion to the client apparatus and transmitting, in response to a request from the client apparatus, the extracted reproduction information to the client apparatus independently of the program data.

[Item 2-5]

A program, which causes a computer to implement:
a function for receiving digital broadcasting data including a plurality of programs;
a function for extracting, from the received digital data, reproduction information including program configuration information and synchronization information to be used for reproduction of a program;
a function for acquiring a designation of a program from a client apparatus;
a function for separating, on the basis of the extracted reproduction information, the program designated by the client apparatus from the received digital broadcasting data and converting the program into a program of a data format to be transmitted to the client apparatus; and
a function for transmitting the program data obtained by the conversion to the client apparatus and transmitting, in response to a request from the client apparatus, the extracted reproduction information to the client apparatus independently of the program data.

[Item 2-6]

A client apparatus, including:
a program designation section configured to designate a program to be distributed from a server which extracts a program from digital broadcasting data including a plurality of programs and distributes the program;
a reproduction information requesting section configured to issue a request for reproduction information including program configuration information and synchronization information to be referred to upon reproduction of program data to be distributed from the server to the server independently of the program designation by the program designation section;
a reception unit configured to receive data distributed from the server; and
a reproduction unit configured to extract, on the basis of the program configuration information included in the reproduction information acquired by the reception unit, video information and audio information from the program data and reproduce the video information and the audio information in synchronism with each other on the basis of the synchronization information included in the reproduction information.

[Item 2-7]

The client apparatus according to item 2-5, wherein the reception unit establishes sessions different from each other for reception of the program data distributed from the server and reception of the reproduction information extracted by the server to receive the program data and the reproduction information, respectively.

[Item 2-8]

A program reproduction method, which causes a processor to execute:
a step of designating a program to be distributed from a program distribution server, which extracts a program from digital broadcasting data including a plurality of programs and distributes the program;
a step of issuing a request for reproduction information including program configuration information and synchronization information to be referred to upon reproduction of program data to be distributed from the server to the server independently of the program designation;
a step of receiving the reproduction information requested to the server from the server independently of the program data distributed from the server;
a step of referring to the received reproduction information to extract video information and audio information from the program data received from the server; and
a step of reproducing the extracted video information and audio information in synchronism with each other.

[Item 2-9]

A program, which causes a computer to implement: a function for designating a program to be distributed from a program distribution server, which extracts a program from digital broadcasting data including a plurality of programs and distributes the program; a function for issuing a request for reproduction information including program configuration information and synchronization information to be referred to upon reproduction of program data to be distributed from the server to the server independently of the program designation;
a function for receiving the reproduction information requested to the server from the server independently of the program data distributed from the server;
a function for referring to the received reproduction information to extract video information and audio information from the program data received from the server; and
a function for reproducing the extracted video information and audio information in synchronism with each other.

[Item 2-10]

A distribution system, including:
the server according to any one of items 2-1 to 2-3; the client apparatus according to item 2-5 or 2-6; and
a network configured to communicate data between the server and the client apparatus therethrough;
the client apparatus issuing a request for a program and reproduction information to be referred to upon reproduction of the program, which are to be distributed from the server through the network, to the server;
the server transmitting the program designated by the client apparatus and the reproduction information of the program independently of each other, to the client apparatus;
the client apparatus reproducing the program received from the server on the basis of the reproduction information received from the server.

REFERENCE SIGNS LIST

2 Antenna, 3 Network, 4 Access point, 100 Server, 102 Reception unit, 104 Storage, 106 Service providing unit, 108 Client management unit, 118 Signal processing section, 120 Buffer, 122 Transmission section, 124 Null packet generation section, 126 Control section, 128 Decoding block, 130 Analysis block, 132 Conversion block, 134 Program acquisition block, 136 Demultiplexing portion, 138 Multiplexing portion, 140 Encryption portion, 200 Client apparatus, 202 Control unit, 204 Reproduction unit, 206 User interface, 208 Transmission/reception section, 216 Service requesting section, 218 Program designation section, 220 Reproduction information requesting section, 222 Decoding section, 224 Demultiplexing section, 226 Synchronization section, 300 Data distribution system.

INDUSTRIAL APPLICABILITY

The present invention can be utilized for a data distribution technology in a server, a client apparatus and a data distribution including the server and the client apparatus.

The invention claimed is:

1. A server, comprising:
a reception unit configured to receive data whose bit rate varies;
a signal processing section configured to convert the data received by the reception unit into data of a data format to be transmitted to a client apparatus and store the data of the data format into a buffer;
a transmission section configured to streaming-distribute, after a given amount of data is stored into the buffer, the data to the client apparatus; and
a control section configured to additionally store, when data is not stored by the given amount into the buffer in a given transmission period, dummy data into the buffer until the given amount is reached, and control the transmission section to transmit a resulting data to the client apparatus,
wherein the resulting data includes additionally stored dummy data.

2. The server according to claim 1, further comprising
a null packet generation section configured to produce a null packet as the dummy data;
the control section controlling, when data is not stored by the given amount into the buffer in the given transmission period, the null packet generation section to produce a null packet until the data is stored by the given amount into the buffer.

3. The server according to claim 2, wherein:
the reception unit is a tuner configured to receive digital broadcasting data including a plurality of programs;
the signal processing section includes
a decoding block configured to decode the data received by the reception unit,
a program acquisition block configured to accept a designation of a program from the client apparatus,
a demultiplexing portion configured to demultiplex video data and audio data of each of the plural programs from the data decoded by the decoding block,
a multiplexing portion configured to multiplex the video data and the audio data of the program acquired by the program acquisition block from within the data demultiplexed by the demultiplexing portion, and
an encryption portion configured to encrypt the data multiplexed by the multiplexing portion and store the encrypted data into the buffer; and
the control section controls, when the data encrypted by the encryption portion is not stored by the given amount into the buffer in the given transmission period, the encryption portion to encrypt the null packet produced by the null packet generation section and store the encrypted null packet into the buffer.

4. The server according to claim 3, wherein the control section controls, when the data encrypted by the encryption portion is stored by the given amount into the buffer in the given transmission period, the transmission section to transmit the data stored in the buffer without controlling the null packet generation section to produce a null packet.

5. A client apparatus, comprising:
a reception section configured to receive streaming data having dummy data inserted therein, the streaming data being transmitted at a bit rate equal to or higher than a given bit rate from a server, including
a reception unit configured to receive data whose bit rate varies,
a signal processing section configured to convert the data received by the reception unit into data of a data format to be transmitted to a client apparatus and store the data of the data format into a buffer,
a transmission section configured to streaming-distribute, after a given amount of data is stored into the buffer, the data to the client apparatus, and
a control section configured to additionally store, when data is not stored by the given amount into the buffer in a given transmission period, dummy data into the buffer until the given amount is reached, and control the transmission section to transmit a resulting data,
wherein the resulting data includes additionally stored dummy data;
a decoding section configured to decode the data received by the reception section; and
a demultiplexing section configured to discard the dummy data in the data decoded by the decoding section and demultiplex video data and audio data from the data.

6. A data distribution method for a processor, comprising:
receiving data whose bit rate varies;
converting the received data into data of a data format to be transmitted to a client apparatus and storing the data of the data format into a buffer;
additionally storing, when data is not stored by a given amount into the buffer in a given transmission period, dummy data into the buffer until the given amount is reached; and
streaming-distributing, after data and dummy data is stored by the given amount into the buffer, the data and the dummy data to the client apparatus.

7. A non-transitory computer readable medium having stored thereon a program for a computer, the program is executed by the computer to perform a method of:
receiving data whose bit rate varies;
converting the received data into data of a data format to be transmitted to a client apparatus and storing the data of the data format into a buffer;
additionally storing, when data is not stored by a given amount into the buffer in a given transmission period, dummy data into the buffer until the given amount is reached; and
streaming-distributing, after data is stored by the given amount into the buffer, the data and the stored dummy data to the client apparatus.

8. A data distribution method, comprising:
receiving, by a processor of a server, data whose bit rate varies;
converting, by the processor of the server, the received data into data of a data format to be transmitted to a client apparatus and storing the data of the data format into a buffer;
additionally storing, by the processor of the server, when data is not stored by a given amount into the buffer in a given transmission period, dummy data into the buffer until the given amount is reached; and
streaming-distributing, by the processor of the server, after data is stored by the given amount into the buffer, the data and dummy data to the client apparatus; and
receiving, by a processor of the client apparatus, the data streaming-distributed from the server;
decoding, by the processor of the client apparatus, the received data; and
demultiplexing, by the processor of the client apparatus, video data and audio data from data obtained by discarding the dummy data in the decoded data.

* * * * *